United States Patent [19]

Winston

[11] Patent Number: 4,990,041
[45] Date of Patent: Feb. 5, 1991

[54] FASTENING DEVICE

[76] Inventor: Emanuel Winston, 1448 Old Skokie Rd., Highland Park, Ill. 60035

[21] Appl. No.: 305,152

[22] Filed: Feb. 1, 1989

Related U.S. Application Data

[63] Continuation-in-part of Ser. No. 228,324, Aug. 4, 1988, which is a continuation-in-part of Ser. No. 885,152, Jul. 4, 1986.

[51] Int. Cl.⁵ .............................................. F16B 13/04
[52] U.S. Cl. ...................................... 411/23; 411/969; 411/970
[58] Field of Search ................... 29/460, 524.1, 525.1, 29/525.2, 527.2, 527.4, 530; 156/92, 93; 411/22, 23, 429, 914, 969, 970

[56] References Cited

U.S. PATENT DOCUMENTS

| | | |
|---|---|---|
| 702,663 | 6/1902 | Lyle . |
| 2,445,172 | 7/1948 | Gravinese et al. . |
| 2,842,022 | 7/1958 | Semmion . |
| 3,036,728 | 5/1962 | Gibb . |
| 3,472,301 | 10/1969 | Pearce, Jr. . |
| 3,485,132 | 12/1969 | Hanny et al. . |
| 3,532,316 | 10/1970 | Mathes . |
| 3,613,495 | 10/1971 | Podgursky . |
| 3,639,137 | 2/1972 | Marinelli . |
| 3,831,213 | 8/1974 | Bedi . |
| 4,063,582 | 12/1977 | Fisher . |
| 4,100,954 | 7/1978 | Müller ........................ 156/92 X |
| 4,164,971 | 8/1979 | Strand . |
| 4,178,363 | 7/1981 | Choi . |
| 4,370,372 | 1/1983 | Higgins et al. ................. 411/23 X |
| 4,394,201 | 7/1983 | Haenssler ...................... 156/92 X |
| 4,425,065 | 1/1984 | Swuray ............................... 411/23 |
| 4,675,972 | 6/1987 | Bappert et al. . |
| 4,691,685 | 9/1987 | Dempsey . |

FOREIGN PATENT DOCUMENTS

| | | |
|---|---|---|
| 613415 | 1/1961 | Canada . |
| 1802770 | 4/1970 | Fed. Rep. of Germany . |
| 2515950 | 10/1976 | Fed. Rep. of Germany . |
| 2755831 | 6/1979 | Fed. Rep. of Germany . |

*Primary Examiner*—Timothy V. Eley
*Attorney, Agent, or Firm*—Frijouf, Rust & Pyle

[57] ABSTRACT

An improved fastening device is disclosed for securing a longitudinally extending body member within an aperture of a workpiece. The fastening device is designed to accept resilient material after it is inserted within the workpiece. In one alternative embodiment the inserted resilient material acts in cooperation with the longitudinally extending body member to lock the device in place and to provide a support structure to the workpiece. In another alternative embodiment, the body member, after injection by the resilient material, assumes the shape of the workpiece aperture. In another alternative embodiment, structure fibers are added and held to the fastening device by the inserted resilient material.

29 Claims, 11 Drawing Sheets

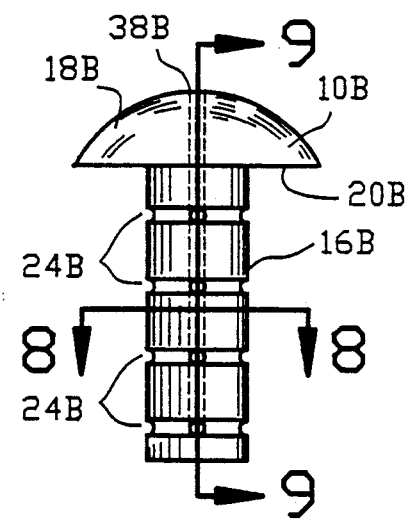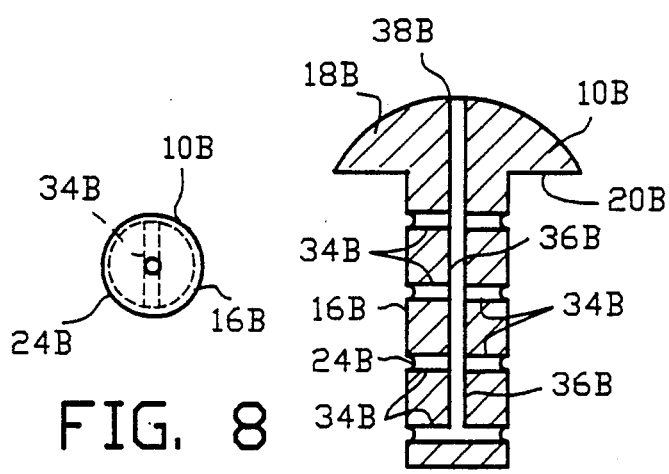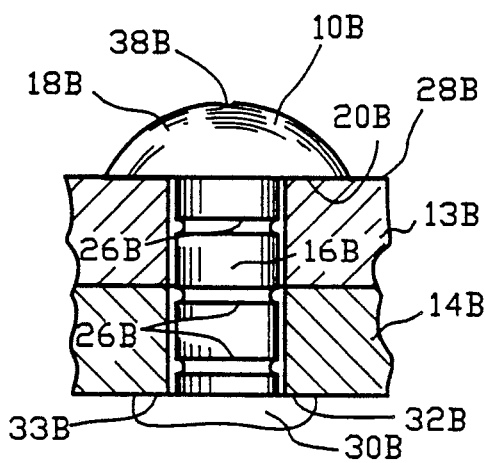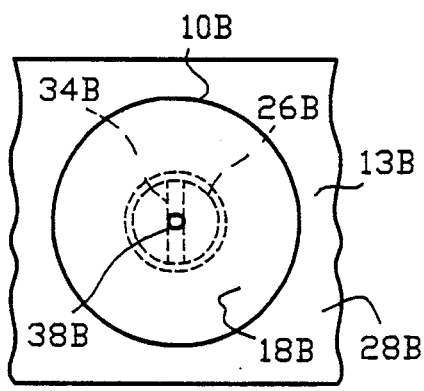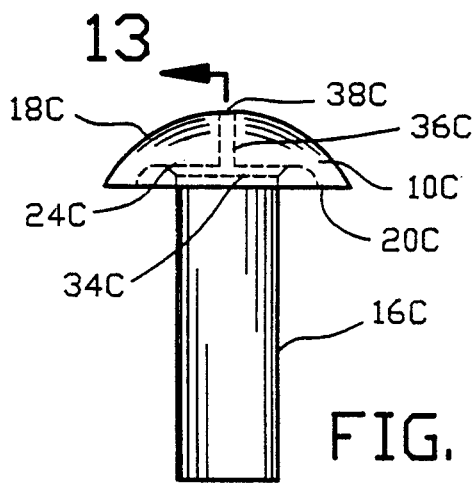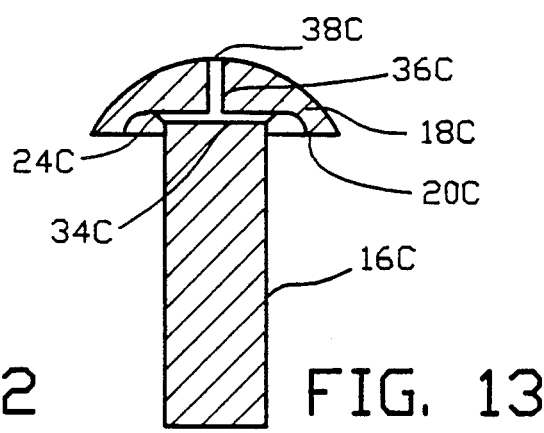

FASTENING DEVICE

RELATED APPLICATIONS

This is a continuation-in-part of application Ser. No. 228,324 filed Aug. 4, 1988, which in turn is a continuation-in-part of application Ser. No. 885,152, filed July 14, 1986, which applications are hereby incorporated by reference herein.

BACKGROUND OF THE INVENTION

1. Field of the Invention

This invention relates to fasting devices. More particularly, this invention relates to fastening devices having increased structural integrity added thereto and which receive therein a resilient material for holding added fibers, the device being secured within an aperture of a workpiece as a result of the received material. This invention also relates to a fastening device for a multi-layered workpiece where the fastening material is injected after the device is in place.

2. Information Disclosure Statement

A common source of failure of conventional metallic fasteners is caused by the vibration or movement between the metallic fastening device and the metallic workpiece. This movement results in fatiguing and the wear of the metallic fastening device which enables further movement resulting in further deterioration of the fastening device. Various types of means and methods have been provided in the prior art for eliminating this undesired movement between a metallic fastening device and a metallic workpiece. Another source of failure is the weakening of the workpiece structure caused by a hard fastener being driven into a material. Another source of failure occurs when a hard fastener is inserted into a workpiece aperture having an irregular internal shape, or when there is to be movement between workpieces after fastening. Another source of failure, and one that is all too common, is the shearing of the fastener due to shear forces acting thereon over a period of time.

Some examples of patents which are pertinent to the instant invention include U.S. Pat. Nos. 207,871, 2,408,559, 2,410,398, 2,417,262, 2,453,994, 2,568,075, 2,677,149, 2,928,446, 2,989,107, 3,362,276, 3,293,977, 4,088,327, 4,140,742, 4,163,812, 4,183,974 and 4,189,369.

Although these prior art patents as well as U.S. Pat. Nos. 4,094,222, 4,100,954, 2,952,129 and 3,082,807 have solved some of the needs of the prior art, none of these patents have successfully provided a simple and efficient fastening device for securing within an aperture of a workpiece for reducing the undesired movement therebetween, or for securing workpieces having irregular-shaped apertures or for adding structural strength to a fastener.

Particularly in the aircraft industry, it has been customary to rivet juxtaposed plates together. These prior art rivets have often included a head portion protruding from the smooth surface of the plate being riveted. Such protruding heads not only detract from the aesthetic appearance of the aircraft, but more particularly present a resistance to air flow resulting in increased fuel costs and a reduction in maximum relative speed of the aircraft.

Although in the prior art various proposals have been disclosed for blind riveting aircraft plates having countersunk heads, these prior art proposals have necessitated the employment of relatively complex riveting equipment. Furthermore, a need has existed in the art for flexibly bonding together adjacent plates in the aircraft industry because it has been found that such flexible bonding reduces the amount of metal fatigue that has been associated with the prior art riveted plates.

The present invention provides a fastening device which enables a plurality of metal plates or laminae to be flexibly bonded together by means of a plurality of elongate members which define channels for the insertion therein of a thermo-setting resin or the like such that there is a clearance between the elongate members and the metal plates, the clearance being filled with the resin. The present invention also provides a fastening device which enables the bonding together of workpieces having irregular apertures, as well as workpieces where high shear loads are experienced.

In the fastening art, there are several examples of situations where structural integrity in the shear direction is mandatory. One such method of achieving such structural integrity is to add structural fibers oriented along the axis of the rivet fastener. However, in many situations this presents a problem particularly where the workpiece apertures are irregular or where there are many apertures not perfectly aligned one with the other. Another instance of difficulty is when the rivet is in place and it is desired to add structural fibers thereafter to give additional strength.

Therefore it is an object of this invention to provide an apparatus which overcomes the aforementioned inadequacies of the prior art devices and provides an improvement which is a significant contribution of the advancement of the fastening art.

Another object of this invention is to provide a fastening device for securing within an aperture of a workpiece the device having a groove disposed along a longitudinally extending body member thereof for receiving a resilient material within the groove for co-acting between the body member and the workpiece for reducing undesired movement thereby.

Another object of this invention is to provide a fastening device for securing within an aperture of a workpiece incorporating a thermal liquifying material within the groove to seal the fastening device to the workpiece upon the application of heat. This same thermal material serves to bond fiber structural material to the fastening device.

Another object of this invention is to provide a fastening device for securing within an aperture of a workpiece including fibers as well as a thermal expandable material disposed within the groove of the fastening device to seal the fastening device to the workpiece upon the application of heat.

Another object of this invention is to provide a fastening device having structural fibers embedded thereon for securing within an aperture of a workpiece wherein a resilient material is injected between the fastening device and the workpiece after insertion of the fastening device into the aperture of the workpiece.

Another object of this invention is to provide a fastening device for securing within an aperture of a workpiece including an aperture extending through a fastener head of the fastening device and in fluid communication with the grooves extending along a longitudinally extending body member of the workpiece enabling a resilient material to be introduced through the fastening head aperture to fill the groove and region between the fastening device and structural fibers to add strength to the fastening device such that the workpiece does not shear the fastening device. The resilient material, in another embodiment is contained within the device and serves to mechanically lock the device and the structural fibers to the workpiece.

Another object of this invention is to provide a method of installing a rivet into an aperture of a workpiece by inserting the rivet into the aperture of the workpiece and deforming the rivet while the rivet is in the aperture of the workpiece by injecting a resilient material through a head aperture in the rivet to resiliently engage the rivet to the workpiece.

Another object of the present invention is to provide a fastening device for fastening together a multi-layered workpiece that overcomes the aforementioned inadequacies of the prior art devices and provides an improvement which significantly contributes to the reduction in wind resistance of the fastened workpiece and the inhibition of metal fatigue.

Another object of the present invention is the provision of a fastening device having added structural fibers, the device adapted for the reception therein of a thermo-setting material in which the thermo-setting material is injected within a channel extending through the fastening device such that the thermo-setting material fills the interstices between the multi-layers of the workpiece, the individual structural fibers and the fastening device.

Another object of this invention is the provision of a method of adding structural fibers to a fastening device while still having the device flexible enough for insertion into a workpiece.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a further understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims in a specific embodiment shown in the attached drawings. For the purpose of summarizing the invention, the invention may be incorporated into a fastening device for securing within an aperture of a workpiece comprising a longitudinally extending body member for insertion within the aperture of the workpiece. A groove is disposed in the longitudinally extending body member for receiving a resilient means established in the groove for co-acting between the longitudinally extending member and the workpiece for reducing undesired movement therebetween.

In a more specific embodiment of the invention, the fastening device may comprise a metallic body member with the metallic locking means including a shoulder extending radially outward from the cylindrical member forming a fastener head. The groove communicates through an aperture in the fastener head for enabling introduction of the resilient means after insertion of thee fastener in the aperture of the workpiece. The grooves may be disposed in the surface of the cylindrical body member of the fastening device and may extend as a helix along the outer cylindrical surface or may comprise a plurality of annular grooves intermittently spaced along the cylindrical body member. In either case, the grooves communicate through a passage to the aperture in the fastener head.

The resilient means may be secured to the fastening device prior to the insertion or may be injected after insertion of the fastening device within the workpiece. The resilient means may include a thermal liquifying material to seal the fastening device of the workpiece upon application of heat. In the alternative, the resilient means may include a thermal expandable material to seal the fastening device to the workpiece upon application of heat. In still a further embodiment, the resilient means may include a resilient adhesive.

The invention also is incorporated in the method of installing a fastening device having a fastening head into an aperture of a workpiece comprising the steps of inserting the fastening device into the aperture of the workpiece. A resilient material is then injected into the fastening device for sealing the fastening device to the workpiece.

Another embodiment of the present invention relates to a fastening device and a method of fastening a multi-layered workpiece in which the fastening device defines means for the reception therein of a thermosetting material. The fastening device includes a first lamina member defining a first plurality of transverse bores such that each of the bores is aligned with an aperture of the plurality of apertures. A plurality of elongate members each includes a first and a second end with the first end of each of the elongate members being secured within one of the plurality of bores. Each of the elongate members defines a longitudinal channel which extends from the first end of the elongate member towards the second end thereof. The channel terminates before the second end of the elongate member. Each of the elongate members may also include a plurality of lateral holes which extend from the channel to the outer surface of the elongate member such that when the thermo-setting material is inserted within the channels the material may flow along the channels laterally along the holes to fill the interstices between the plurality of apertures and the elongate members within the apertures for maintaining a clearance between the workpiece and the elongate members and for fastening the layers of the workpiece together. A separate planar member, itself having elongate members aligned with the plurality of bores, is used to force the material into the channels.

In another embodiment of the present invention, the elongate member can be inserted into the workpiece as a flexible outer shell being substantially hollow inside. After the insertion, material such as for example, thermo-setting material, can be inserted into the hollow elongate member thereby expanding the member and perhaps even flowing through slits or passages in the material to lock the insert in place. Of course, when this arrangement is used with a plurality of workpieces abutted one against the another, the expansion of the insert can be utilized to maintain the workpieces together.

In a still more specific embodiment, the elongate member can be dispersed along a lateral plane of the workpiece and set into a groove cut into the workpiece in the manner of groove and tongue construction. After the fastening device is in the groove, material can then be forced into the fastening device setting the fastening device so that it cannot be removed. Under such an arrangement, the fastening device acts to provide mechanical support to the workpiece.

One solution to the structural integrity problem is to use a sleeve of fibers oriented along the length of the rivet. This sleeve of fibers, in one embodiment be flexibly linked one to another and wrapped around the body of the rivet. While in this mode, the fibers would be free to flex and assume the shape of the irregular opening. Once the rivet were in place, resilient material would be inserted through the head of the rivet would flow through openings, particular a longitudinal opening, in the body of the rivet. This resilient material would serve to unilock the rivet with the structural fibers thereby providing a unified structure having very high shear resisting capabilities. Thus, it is one object of the invention to provide an arrangement of structural fibers linked to the rivet by an insertion of a resilient material which serves to bond the fibers to the rivet.

Another embodiment of the invention is the insertion of the structural fibers within the body of the rivet and thereupon the insertion of resilient material to bond the fibers to the body of the rivet after the rivet has been installed in the workpiece.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claim of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in appended claims.

BRIEF DESCRIPTION OF THE DRAWINGS

For a fuller understanding of the nature and objects of the invention, reference should be had to the following detailed description taken in connection with the accompanying drawings in which:

FIG. 7 is a side elevational view of a third embodiment of an improved fastening device;

FIG. 8 is a sectional view along line 8—8 of FIG. 7;

FIG. 9 is a sectional view along line 9—9 of FIG. 7;

FIG. 10 is a side sectional view of the fastening device shown in FIGS. 7-9 secured to a workpiece;

FIG. 11 is a plan view of FIG. 10;

FIG. 12 is a side view of a fourth embodiment of an improved fastening device;

FIG. 13 is a sectional view along line 13—13 of FIG. 12;

Similar reference characters refer to similar parts throughout the several views of the drawings.

DETAILED DISCUSSION

Figure 1:
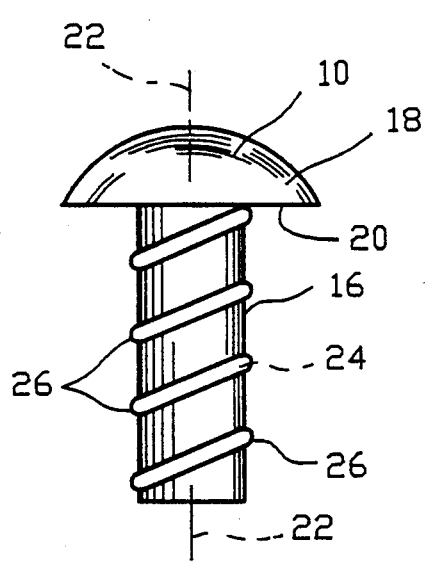
FIG. 1 is a side elevational view of a first embodiment of an improved fastening device.
Figure 2:
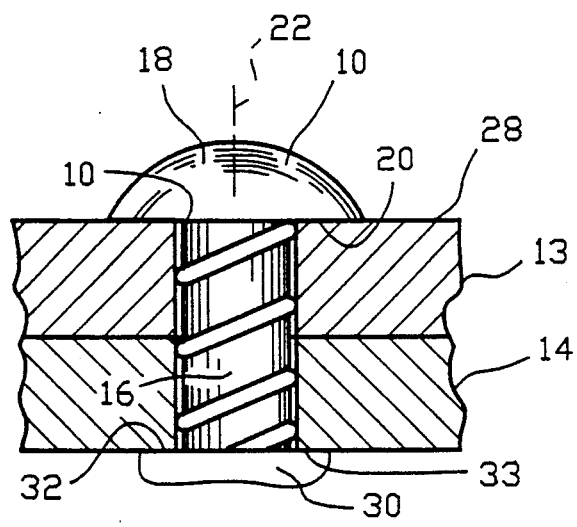
FIG. 2 is a side sectional view of the fastening device of FIGS. 1 secured within the aperture of a workpiece.
Figure 3:
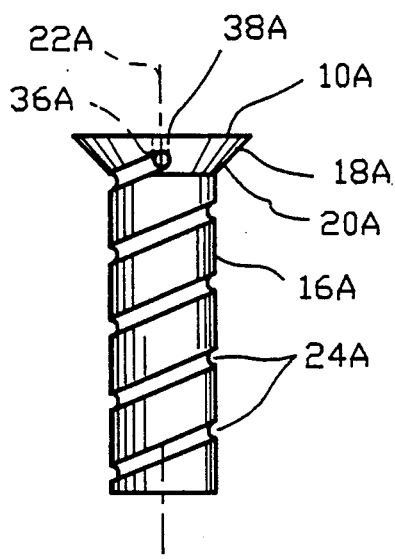
FIG. 3 is a side elevational view of a second embodiment of a fastening device.

FIG. 1 is a plan view of a fastening device 10 for securing within an aperture 12 shown in FIG. 2 of a workpiece 13 and 14. The fastening device comprises a longitudinally extending body member 16 preferably made of a metallic material such as copper, aluminum, brass, steel and the like having a fastening head 18 integrally attached thereto forming a locking means shown as a locking shoulder 20. The body member 16 is substantially cylindrical about an axis 22 with the shoulder 20 extending radially outwardly therefrom.

The invention comprises groove means 24 in this embodiment shown as a helix extending along the longitudinally extending body member 16 for receiving a resilient means 26 such as a resilient material which is secured to the groove means 24 by various means which are well known in the art.

FIG. 2 illustrates the insertion of the fastening device 10 within the aperture 12 of the workpiece 13 and 14 whereby the locking shoulder 20 engages a surface 28 of workpiece 13. The lower portion of the body member 16 is deformed at 30 creating a shoulder 32 to engage a bottom surface 33 of workpiece 14. It should be appreciated that the shoulder 32 and 20 engaging surfaces 28 and 33 mechanically secure the fastening device to the workpiece 13 and 14.

The cylindrical body member 15 is slightly smaller is diameter than the aperture 12 enabling the resilient means 26 to engage the surfaces of the aperture 12 to thereby reduce mechanical abrasion between the workpieces 13 and 14 and the fastening device 10. The resilient means 26 is disposed between the workpiece and the member 16 such that the resilient means 26 fills the clearance between the workpiece and the member 16. This reduction in abrasion substantially reduces fatiguing of the metallic fastening device which typically results in failure. FIGS. 1 and 2 illustrate an embodiment of the invention wherein the resilient means is installed on the fastening device prior to insertion within a workpiece.

FIGS. 3–6 illustrate a second embodiment of the invention wherein the resilient means is injected between the fastening device and the workpiece after insertion of the fastening device within the workpiece aperture. In this embodiment the fastening device 10A is adapted for insertion within an aperture 12A of workpieces 13A and 14A and comprises a longitudinally extending body member 16A having a fastening head 18A defining a locking shoulder 20A. A helical shaped groove 24A is disposed in the cylindrical surface of the body member 16A and is connected by passages 34A and 36A to an aperture 38A.

Figure 5:
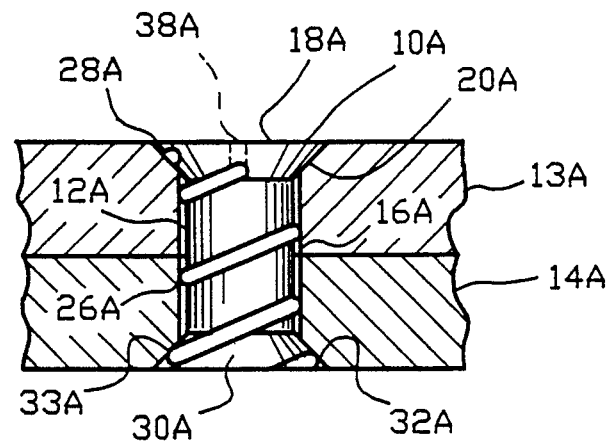
FIG. 5 is a side sectional view of the fastening device of FIGS. 3 and 4 secured within a workpiece.
Figure 4:
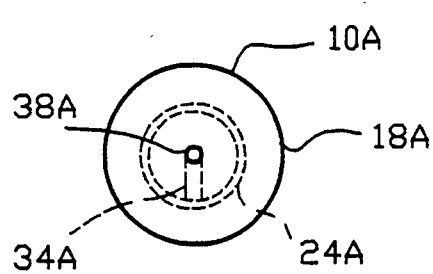
FIG. 4 is a plan view of FIG. 3.
Figure 6:
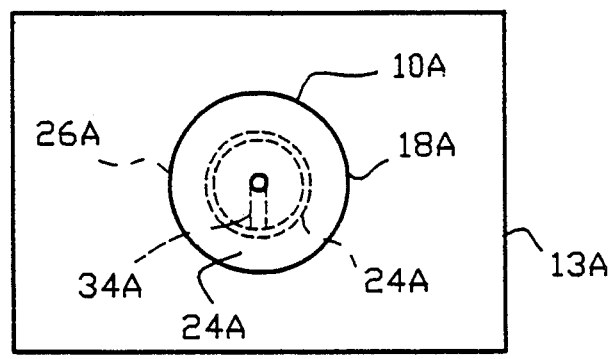
FIG. 6 is a plan view of FIG. 5.

FIG. 5 illustrates the securing of the fastening device 10A to the workpieces 13A and 14A. Shoulder 20A is abutted against surface 28a of workpiece 13A whereas the lower portion of the body member 10A is deformed at 30A to provide shoulder 32A for abutment with surface 33A of workpiece 14A. Thereafter a resilient material 26A is injected through aperture 38A to flow along passages 36A and 34A to fill groove 24A to provide a resilient engagement between the fastening device 10A and the workpieces 13A and 14A. The resilient material 26A fills the clearance between the workpieces and the fastening device 10A such that no contact between the device 10A and the workpieces exists except through the material 26A. The resilient material 26A may be restricted to the region in proximity to the grooves 24A as shown or may be injected to fill other voids between the body member 16A and the aperture 12A, depending upon the particular application.

FIGS. 7–9 illustrate a further embodiment of the invention comprising a fastening device 10B having a body member 16B with a head 18B defining a locking shoulder 20B. In this embodiment, a plurality of intermittently spaced annular grooves 24B are connected by passages 34B and a central passage 36B to an aperture 38B.

FIGS. 10 and 11 illustrate the securing of the fastening device 10 into workpieces 13B and 14B. Shoulder 20B engages surface 28B with the lower portion of the body member 16B being deformed at 30B creating a shoulder 32B for engagement with surface 33B of workpiece 14B. Shoulders 20B and 32B create a seal with surfaces 28B and 33B of the workpieces 13B and 14B. The resilient material 26B is then injected through aperture 38B to flow along passage 36 and passage 34 to provide the resilient material between the fastening device 10B and the workpieces 13B and 14B. The illustration of FIG. 10 shows the resilient material being disposed only adjacent the grooves 23, but it is understood that continuing injection of the resilient material will result in further resilient material being disposed between the fastening device 10B and the workpieces 13B and 14B. In both cases the resilient material 26B maintains clearance between the workpieces and the fastening device 10B.

Figure 14:
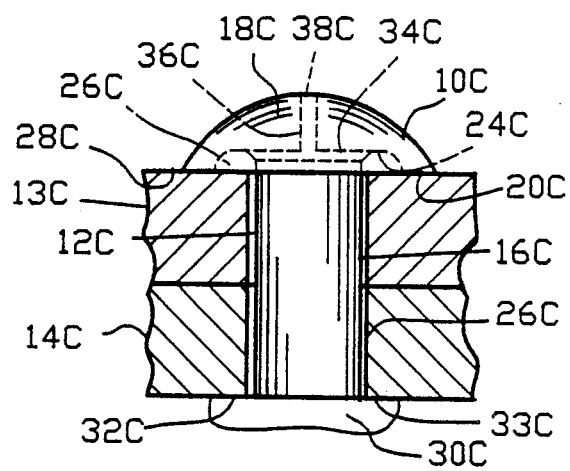
FIG. 14 is a side sectional view of the fastening device shown in FIG. 12 and 13 secured to a workpiece.
Figure 15:
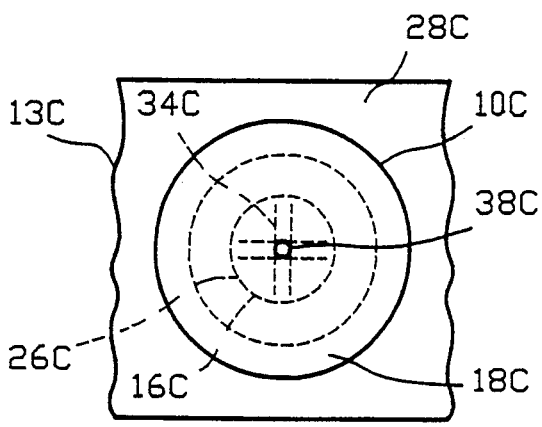
FIG. 15 is a plan view of FIG. 14.

FIGS. 12–15 illustrate still a fourth embodiment of the invention showing a fastening device 10C having a body member 16C and a fastening head 18C defining a locking shoulder 10C. A groove 24C is disposed in the shoulder surface 20C with passages 34C interconnected to a central passage 36C terminating in an aperture 38C. FIGS. 14 and 15 illustrate the securing of the fastening device 10C within the workpieces 13C and 14C. Shoulder surface 20C is abutting surface 28C of workpiece 13C whereas the lower portion of the body member 16C is deformed at 30C to create a shoulder 32C to engage surface 33C of workpiece 14C. The diameter of the cylindrical body member 16C is slightly smaller than the diameter of aperture 12C in workpieces 13C and 14C. Resilient material 26C is injected through aperture 38C to flow through central passages 36C and passage 34C to fill groove 24C. Continued injection results in resilient material flowing between the body member 16C and the workpieces 13C and 14C. A seal is formed by shoulder surface 20C and deformed shoulder 32C with the surfaces 28C and 33C respectively. It should be appreciated by those skilled in the art that in this embodiment, the complete region between the fastening device and the workpieces 13C and 14C is filled with the resilient material to reduce any movement between the workpieces 13C and 14C and the fastening device 10C.

Figure 16:
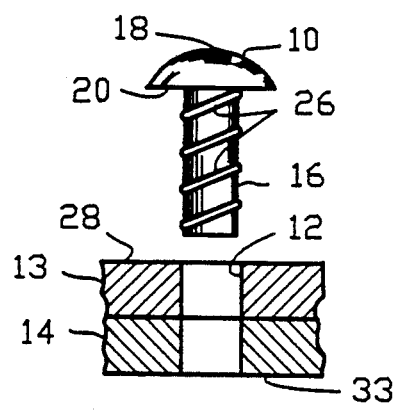
FIG. 16 is a first step in the first method of securing a fastening device to a workpiece.
Figure 17:
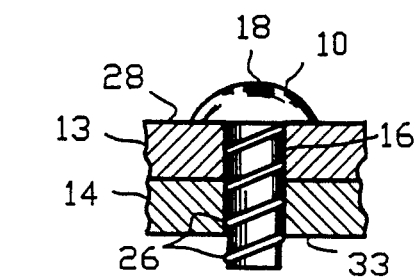
FIG. 17 is a second step in the first method of securing a fastening device to a workpiece.
Figure 18:
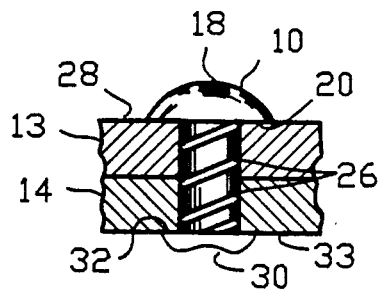
FIG. 18 is a third step in the first method of securing a fastening device to a workpiece.

FIGS. 16–18 illustrate the steps in a first method of securing a fastening device within an aperture of the workpiece. The fastening device is illustrated as the device shown in FIGS. 1 and 2, but it should be appreciated that the use of this device is merely for an example of the method wherein the resilient means is fixed to the fastening device prior to insertion within the workpiece.

FIG. 16 illustrates the workpieces 13 and 14 and the fastening device 10 with the resilient means 26 affixed thereto. The resilient means 26 may be affixed by molding or adhesive or other similar means which are well-known to the art.

FIG. 17 illustrates the insertion of the fastening device 10 within the aperture 12 of workpieces 13 and 14 with the resilient means 26 engaging the aperture surfaces 12.

FIG. 18 illustrates the formation of the lower portion of the body member 16 at 30 creating a shoulder 32 to engage surface 33 of workpiece 14 concomitantly with locking shoulder 20 engaging surface 28 of workpiece 13.

FIGS. 19-23 illustrate the steps of a second method of affixing a fastening device to an aperture within a workpiece. In this example, the fastening device is identical to that shown in FIGS. 7-11, but it should be appreciated by those skilled in the art that numerous other variations of mechanical fasteners may be incorporated utilizing the concept wherein the resilient means is injected through the fastening device subsequently to insertion within the workpiece.

Figure 19:
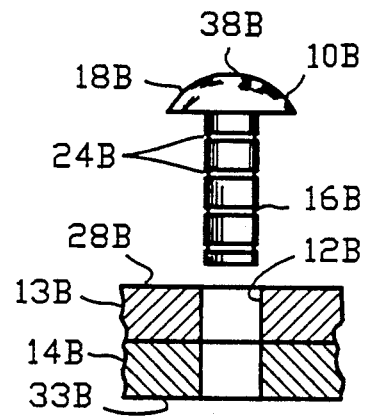
FIG. 19 is a first step of the second method of securing a fastening device to a workpiece.

FIG. 19 illustrates the fastening device 10B void of any resilient material thereon positioned over the workpieces 13B and 14B.

Figure 20:
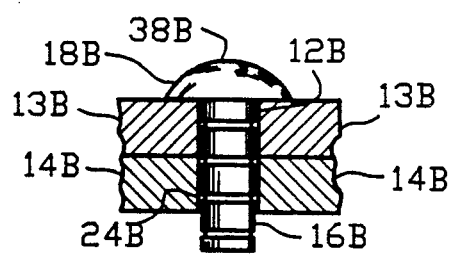
FIG. 20 is a second step of the second method of securing a fastening device to a workpiece.

FIG. 20 illustrates the insertion of the workpiece 10B into the aperture 12B of workpieces 13B and 14B.

Figure 21:
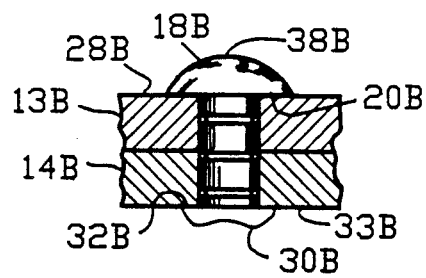
FIG. 21 is a third step of the second method of securing a fastening device to a workpiece.

FIG. 21 illustrates the deformation of the body member 16B at 30B forming shoulder 32B for engagement with surface 33B of workpiece 14B. Shoulder 20B is similarly in engagement with surface 28B of workpiece 13B.

Figure 22:
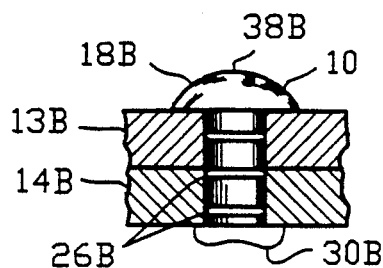
FIG. 22 is a third step of the second method of securing a fastening device to a workpiece.

FIG. 22 illustrates the result of injection of resilient material through aperture 38B for filling grooves 24B as explained heretofore. In this example, only the region adjacent the grooves has been filled with resilient material but it should be understood that this method is suitable for use with either a partial or complete filling of the void between the fastening device and the workpiece.

Figure 23:
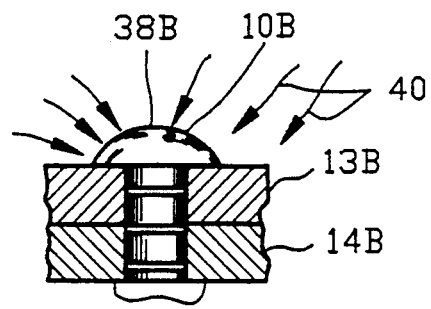
FIG. 23 is an optional fifth step of the second method of securing a fastening device to a workpiece.

FIG. 23 demonstrates the optional step of heating the fastening device as illustrated by the arrows 40 for use with a thermo-expandable or thermo-setting resilient material. It should also be understood that various types of material may be incorporated into this invention including epoxys, thermo-adhesives, preheated thermo expanding adhesives and the like. It should also be understood that the injection of material may take place subsequent to the deformation of the body member as shown in FIGS. 21 and 22 or, in the alternative, injection may be accomplished simultaneously with the deformation. Various other arrangement and variations may be resorted to without departing form this invention.

Figure 24:
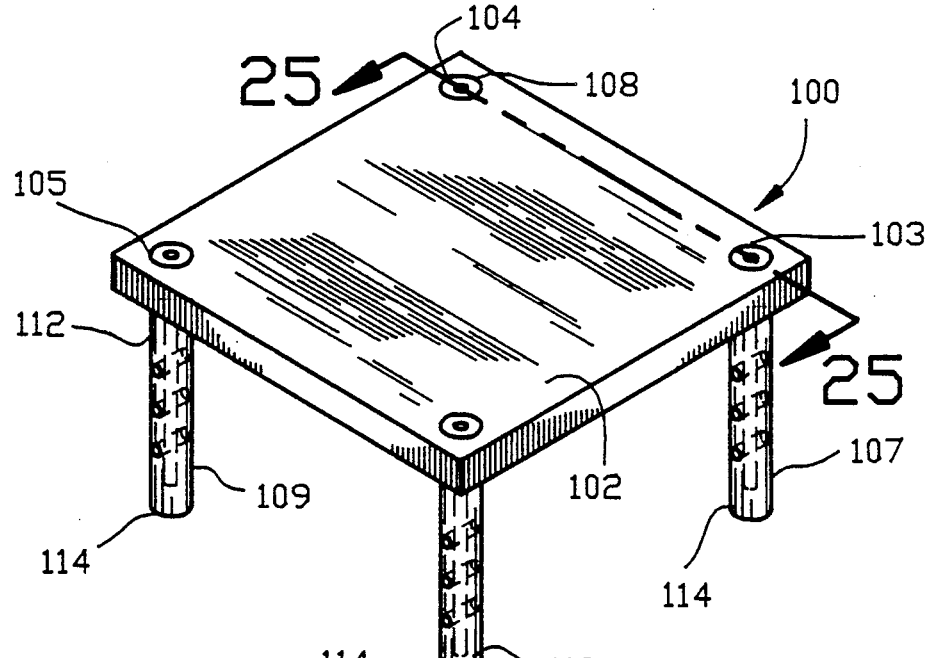
FIG. 24 is a perspective view of a fifth embodiment of the fastening device according to the present invention for fastening a multi-layer workpiece.

FIG. 24 is a perspective view of the fastening device generally designated 100 of a fifth embodiment of the present invention. The fastening device 100 includes a first lamina member 102 having a first plurality of bores 103, 104, 105 and 106 drilled normal therethrough. The first laminar member 102 is planar and of square configuration. Four elongate member 107, 108, 109 and 110 extend normally from the bores 103 to 106. Each of the elongate member 107 to 110 include a first and second end 112 and 114 respectively. The first ends 112 of the elongate members 108 to 110 are secured within the bores 103-106 of planar surface 102.

Figure 25:
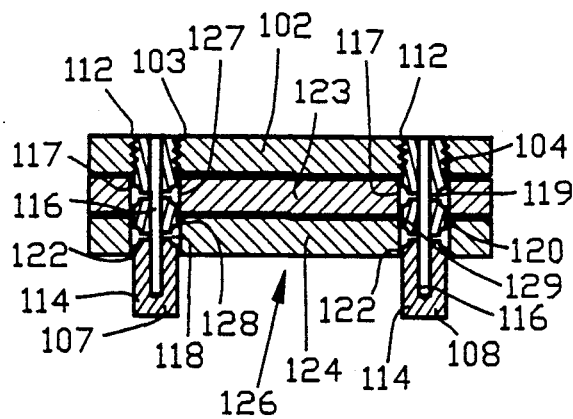
FIG. 25 is a sectional view taken on the line 25—25 of FIG. 24.

As shown in FIG. 25 which is a sectional view taken on the line 25—25 of FIG. 24, the first ends 112 of the elongate members 107 and 108 are threadably engaged within the first lamina member 102. Each of the elongate members 107 to 110 include a longitudinal channel 116 which extends from the first end 112 of the elongate members 107 and 108 towards the second end 114 thereof. The channel 116 terminates before the second end 114 of the elongate member 107 and 108. A plurality of lateral holes 117, 118, 119 and 120 radiate from the longitudinal channel 116 and terminate at the outer surface 122 of the elongate members 107 and 108. A plurality of layers 123 and 124 of a workpiece generally designated 126 each includes a plurality of apertures 127, 128, 129 and 130 which are aligned with the bores 103 and 104 such that the second ends 114 of the elongate members 107 and 108 may be guided through the apertures 127-130 until the first lamina member 102 is disposed adjacent to the layer 123. A thermo-setting material such as an epoxy resin is injected into the longitudinal channel 116 at the first end 112 of the elongate members 107 and 108 and the resin (not shown) flows along the longitudinal channel 16 and laterally through the holes 117-120 to fill the interstices between the apertures 127 to 130 and the elongate members 107 and 108. The resin fills the clearance between the workpiece and the elongate members such that no contact between the workpiece and the elongate members exists except through the resin.

Figure 26:
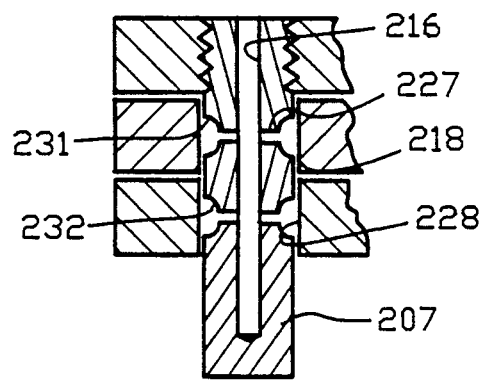
FIG. 26 is an enlarged sectional view of a sixth embodiment of the present invention showing the annular grooves defined by the elongate member.

FIG. 26 is an enlarged sectional view of a sixth embodiment of the present invention and shows an elongate member 207 which defines a plurality of annular grooves 231 and 232 disposed along the length of the elongate member 207 such that the annular grooves 231 and 232 communicate with the lateral holes 217 and 218 respectively such that resin flowing along the channel 216 and through the lateral holes 217 and 218 passes around the annular grooves 231 and 232 before filling the interstices disposed between the apertures 227 and 228 and the elongate member 207.

Figure 27:
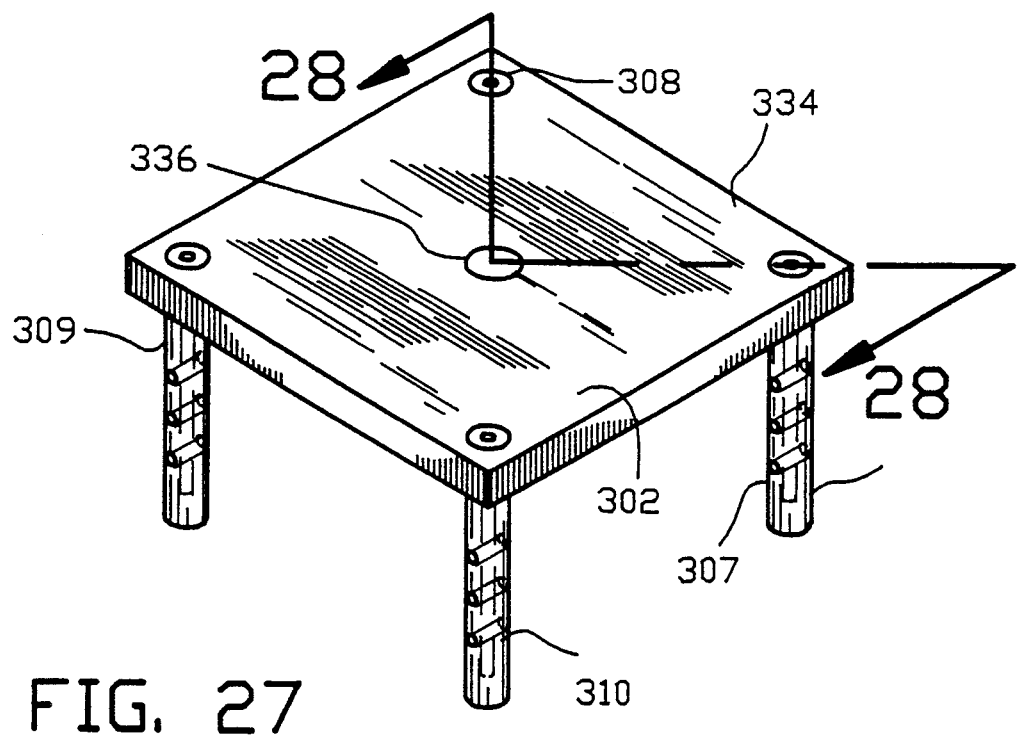
FIG. 27 is a perspective view of a seventh embodiment of the present invention.

FIG. 27 shows a perspective view of a seventh embodiment of the present invention in which one surface 334 of the first lamina member 302 defines a sprue 336 for simultaneously injecting the resin within each of the channels of each of the elongate members 307, 308, 309, and 310.

Figure 28:
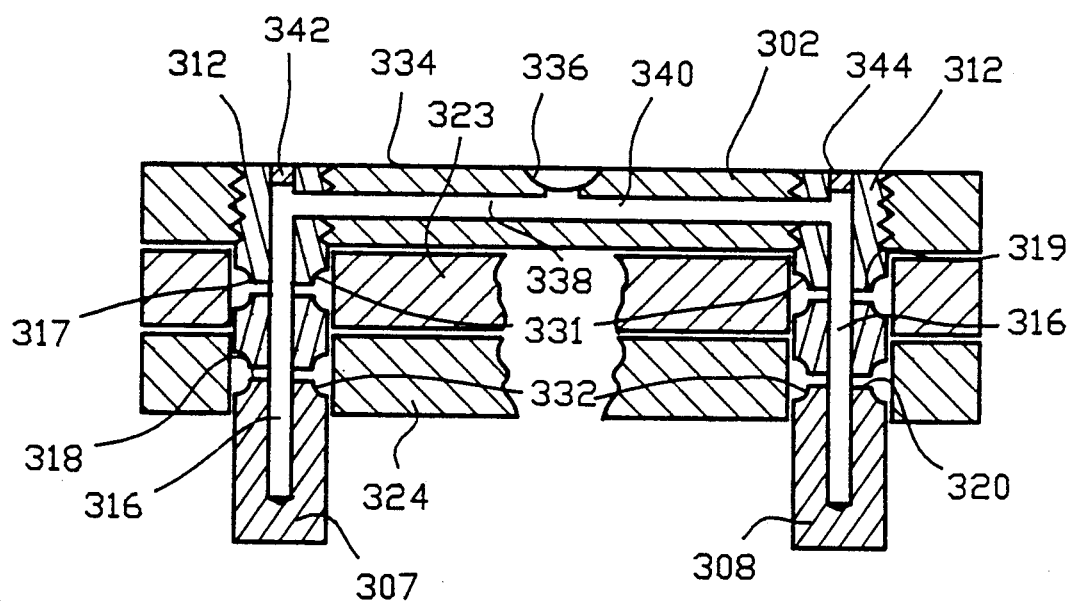
FIG. 28 is an enlarged sectional view taken on the line 28—28 of FIG. 27.

FIG. 28 is a sectional view taken on the line 28—28 of FIG. 27 and shows the sprue 336 defined by the outer surface 334 of the first lamina member 302. A plurality of passages 338 and 340 extend radially from the sprue 336 and communicate with the channels 316 of the elongate members 307 and 308 adjacent the first ends 312 of the elongate members. The first ends 312 of the longitudinal members 307 and 308 are plugged by plugs 342 and 344 respectively such that when resin is injected into the sprue 336 resin will flow radially through the passages 338 and 340 and will flow along the channels 316 and laterally through the holes 317, 318, 319 and 320 and around the annular grooves 331 and 332 to fill the interstices between the layers 323 and 324 and the elongate members 307 and 308.

Figure 29:
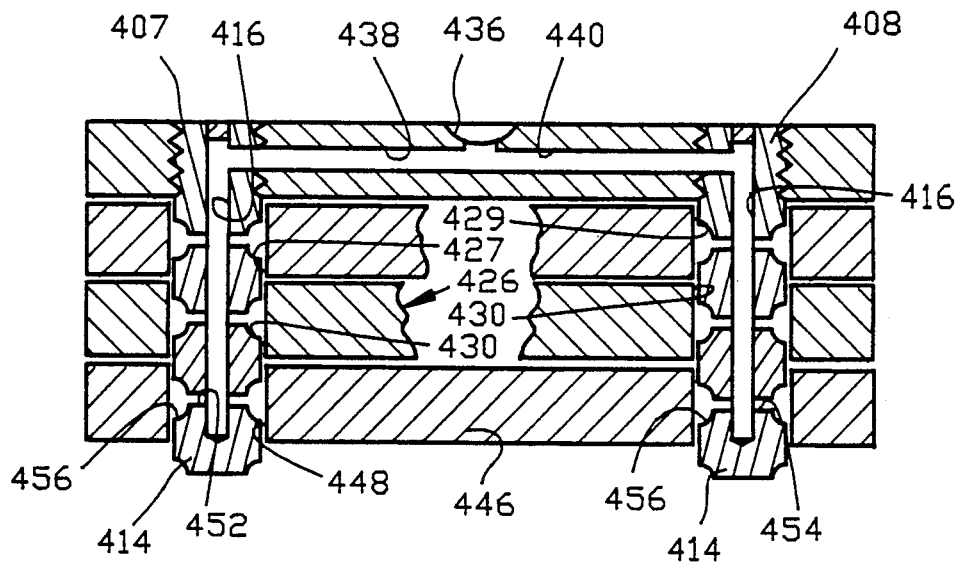
FIG. 29 shows an eighth embodiment of the present invention showing the second lamina member disposed adjacent the workpiece.

FIG. 29 is an eighth alternative embodiment of the present invention and is similar to the embodiment shown in FIG. 28 but shows a second lamina member 446 which defines bores 448 and 450 of a second plurality of bores which are aligned with the apertures 427, 428, 429 and 430 defined by the workpiece 426. The second ends 414 of elongate members 407 and 408 extend through the bores 448 and 450 and a plurality of further lateral holes 452 and 454 extend radially from the channels 416 to a further annular groove 456 which is disposed within the bores 448 and 450 such that when resin flows through the longitudinal channels 416 and laterally through the holes 452 and 454 the annular groove 456 is filled prior to the resin flowing between the interstices between the second lamina member 446 and the second end 414 of the elongate members 407 and 408 of the fifth embodiment.

In each of the sixth, seventh and eighth embodiment an essential feature of the present invention resides is the provision of a clearance between the workpiece and the elongate members, such clearance being filled with resin.

In operation of the fastening device 100, the first lamina member 102 is clamped to the workpiece 126 and a plurality of bores are drilled through the adjacent first lamina member and workpiece. A threaded first end of the elongate members 107 and 108 threadably engage the bores 103 and 104 and the second end 114 of each of the elongate members 107 and 108 are guided through the apertures 127 and 128 of the workpiece 126 until the first layer 123 of the workpiece 126 is disposed adjacent to the first lamina member 102. A thermo-setting resin is injected through the longitudinally channels 116 adjacent the first end 112 of the longitudinal channels 116 such that the resin flows along the longitudinal channel and flows laterally along the lateral 117 and 118 holes to fill the interstices between the apertures of the workpiece and the longitudinal member.

In the sixth alternative embodiment the resin flows from the lateral holes and around the annular grooves 231 and 232 before the flowing into the interstices between the apertures and the elongate members.

The seventh alternative embodiment includes inserting the elongate members 307 and 308 through the apertures in the workpiece as in the other embodiments of the present invention but instead of individually injecting the resin through each of the individual channels, the resin is simultaneously injected into all of the channels by injecting the resin through the sprue 336 such that the resin flows radially through the passages 338 and 340 which are in communication with the respective longitudinal channels.

In operation of the eighth embodiment of the present invention, the second ends of the elongate members 407 and 408 are inserted through the bores 448 and 450 of the second plurality of bores after the workpiece has been connected to the longitudinal members, thereafter the resin is simultaneously injected within each of the longitudinal channels 116 from the sprue 436 and the passages 438 to 440 and the resin flows laterally through the holes 452 and 454 and around the annular groove 456 before filling the interstices between the bores 448 and 450 and the second end 414 of the elongate members 407 and 408.

The fifth to eighth embodiments of the present invention provide a fastening device for fastening together a plurality of layers of a workpiece to provide a completely smooth surface, thereby reducing wind resistance or the like. Furthermore, the present invention provides a flexible bond between the elongate members and the workpiece which reduces the metal fatigue between the layers of the workpiece.

Figures 30, 31, 32, 33:
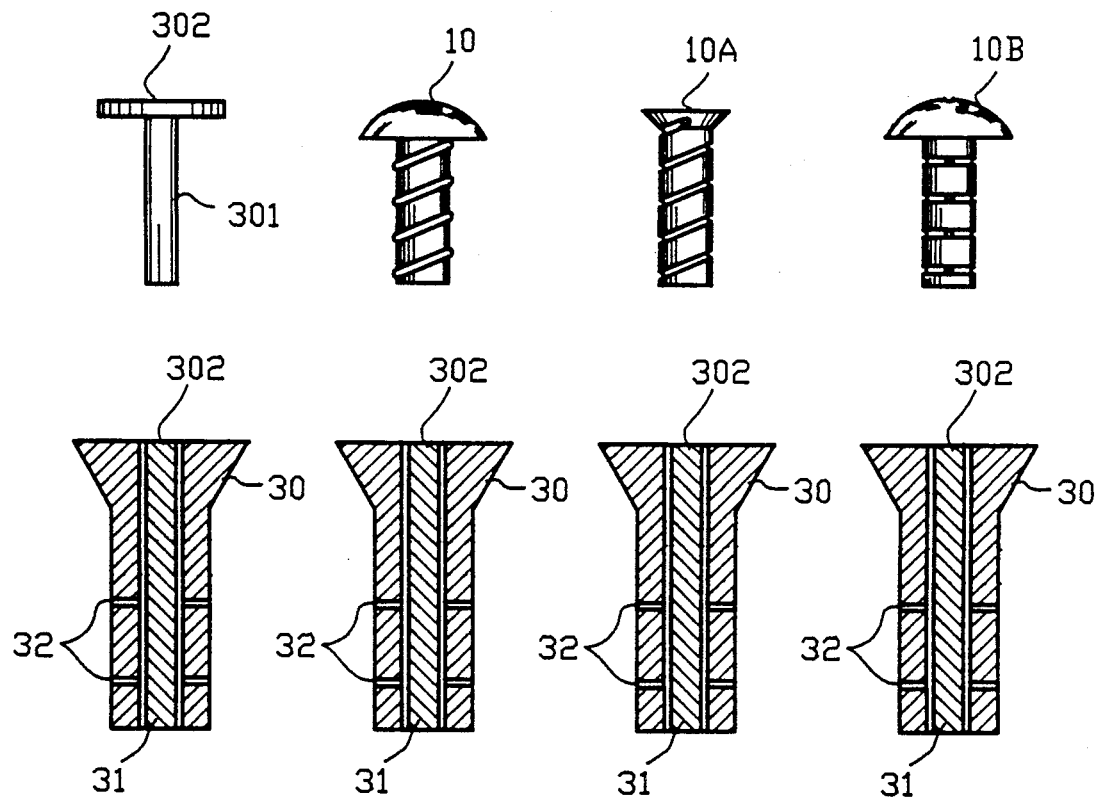
FIG. 30 shows an embodiment where a member is used to force material into the hollow insert.
FIGS. 31-33 show alternate embodiments where the member which forces the material into the insert is adapted to receive the extra material through an opening in a top surface.
Figure 34:
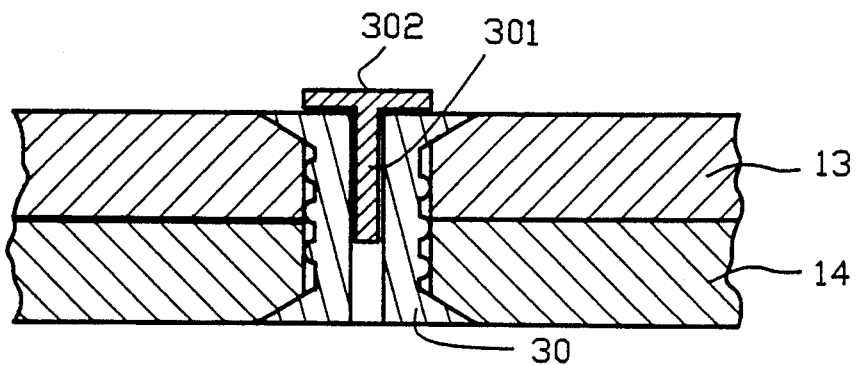
FIG. 34 shows a cross-sectional view of a workpiece where the member has been forced into position.

FIGS. 30–34 show a device 30 which has an opening 302 in its top surface for the insertion of additional material therein after the device has been embedded in a workpiece, such as workpiece 13 and 14 of FIG. 34. In FIG. 30, a screw or bolt 302 is forced into opening 302 thereby forcing material into the opening which material can either expand the fastener or escape via channels 32 into the adjoining work surface. In FIG. 31, the material to be added is on the exterior of device 10 while in FIG. 32, the material is inserted through the top of device 10A and spirals around the conical cut outs as discussed hereinabove. In a similar fashion, the device 10B of FIG. 33 inserted into device 30 and allows external material to be added after the device is embedded in the work surface.

Figure 36:
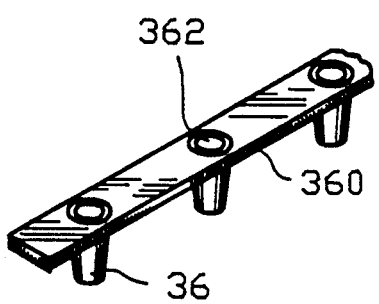
FIGS. 36 and 37 show a strip holding a plurality of fastening devices each having openings in a top surface for the insertion of material therethrough.
Figure 37:
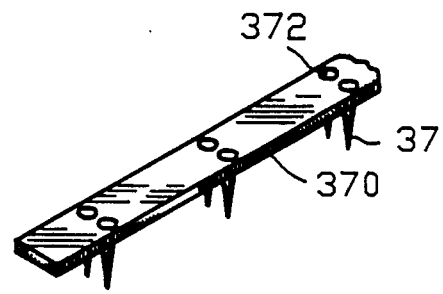

In FIGS. 36 and 37, a group of deivces 36 are shown attached to a common bonding element 360. Each of the fastening devices has an opening in its top surface, such as opening 362, so that material may be added after the plurality of fasteners have been inserted into mating holes in a work surface. In FIG. 37, the same structure is shown with the difference being that the shape of the fastener is more pointed and, as material is forced into openings 372, the fastener expands to hold the fastener in place within the work surface. Of course, as discussed above, if a plurality of work surfaces are mated, then device 37 would be designed to be long enough to engage all such devices through an aperture common to all.

Figure 35:
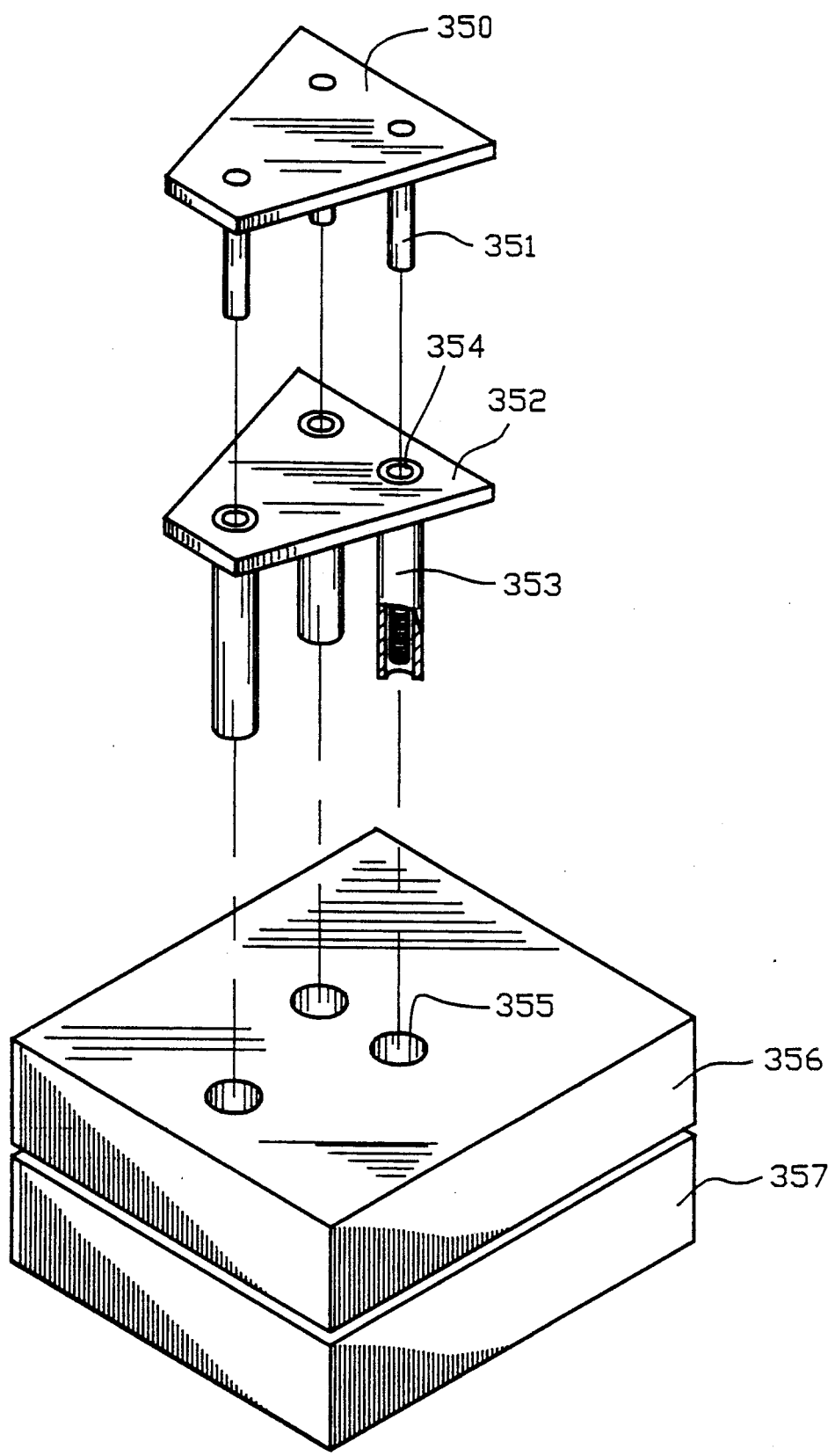
FIG. 35 shows a planar surface having elongated members each being hollow with a separate planar surface used to hold elongated members which force material into the elongated members of the first planar surface.

In FIG. 35 there is shown two workpieces 356 and 357 having holes 355 bored therethrough. A planar surface 352 has inserted therethrough three elongate members 353, each having an opening 354 in a top surface. This device is pressed into work surface 356 and 357 and a separate device 350, itself having three elongate members 351 aligned to mate within three elongate member 353 of device 352, is pressed into mating relationship with surface 352 thereby forcing material which has been added via hole 354 down into the elongate members 353 so as to lock the members in place inside work pieces 356 and 357 in a manner previously discussed.

Figure 38:
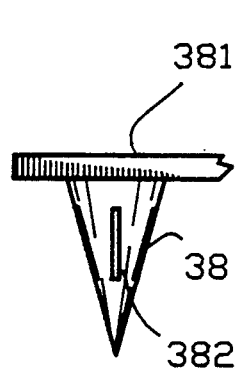
FIGS. 38 and 39 show a expandable fastener having slits and an opening for receiving extraneous material.
Figure 39:
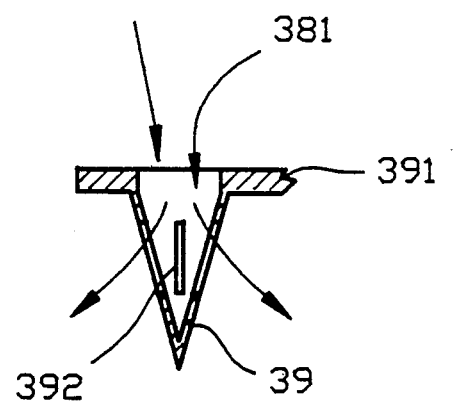

FIGS. 38 and 39 show an alternate embodiment of the device which is conical-shaped for easy insertion into a work surface. The inside of the device is hollow while the outside surface has slats or holes 382 cut therein such that when the device is inserted into a work surface, material can be added via top opening 381 thereby expanding the device to lock in place while also allowing the material to seep from the slots thereby assisting in locking the device in place.

Figure 40:
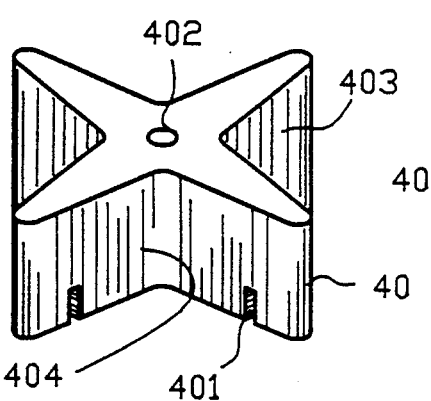
FIGS. 40 and 41 show fasteners having structures which add to the integrity of the workpiece.

In FIG. 40, fastening device 40 is shown having radially displaced fingers 403 from a central core 404 having an opening 402 for the insertion therein of material. Device 40 is designed so that it can give structural integrity to a work surface when it is inserted therein. Material which is inserted in opening 402 is free to flow out of openings 401 thereby allowing the device to lock in place. This material can fill the voids between fingers 403 if so desired.

Figure 41:
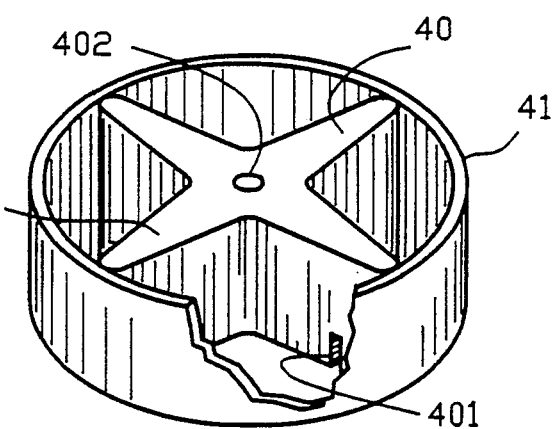

FIG. 41 shows device 40 with an outer band 411 interconnecting radial fingers 403 so as to contain the material which is injected into the device via opening 402. Outer band 411 also provides an added measure of support to the workpiece.

Figure 42:
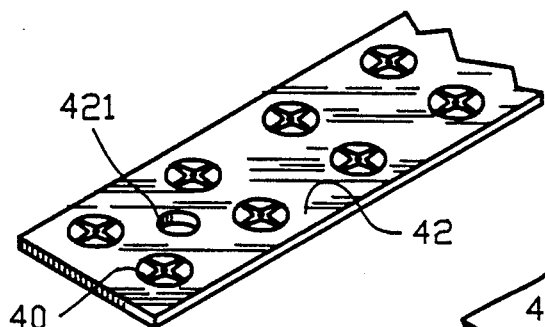
FIG. 42 shows a planar structure having a plurality of fasteners attached thereto.
Figure 43:
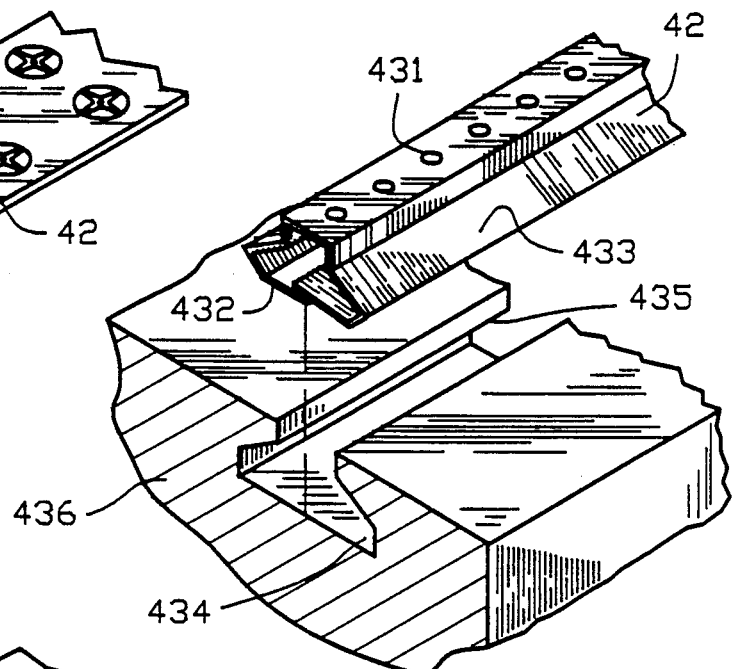
FIGS. 43 and 44 show a horizontally elongated structure for insertion in a groove in the workpiece.
Figure 44:
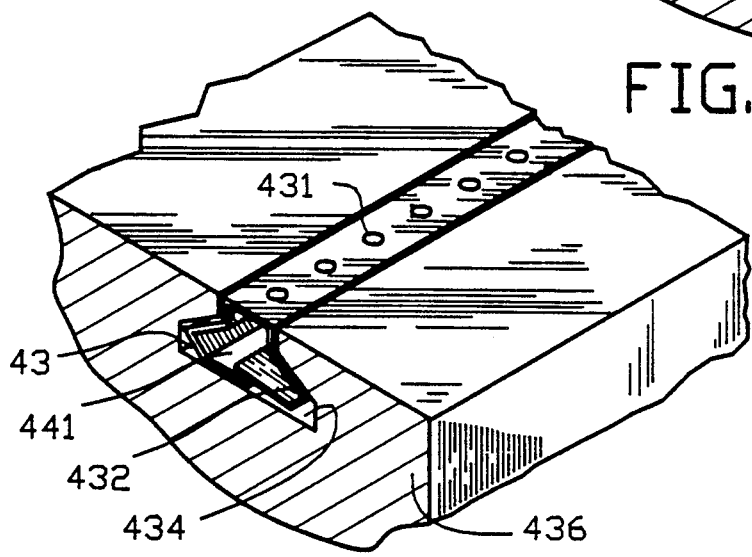

FIG. 42 illustrates a plurality of such devices on a common planar sheet 42 for insertion into a work surface all at one time. A common channel within sheet 42 will allow all of the devices to be filled at one time from a common opening or space 421. In FIG. 43, work surface 436 is shown with a horizontal groove 435 cut therein. This groove can have any shape but advantageously will have a shape such that locking device 43 which initially is empty on the inside so that it can be collapsed, and slipped into the groove. To facilitate the collapsing of device 43, bottom surface 432 can be an overlapped panel as shown or can be inwardly flexible. Once device 43 is forced into groove 435 as shown in FIG. 44, material, via holes 431, can be inserted into device 43 thereby expanding device 43 and locking it permanently into place. Of course, several work pieces can be abutted together and the bottom surface 432 of device 43 can be below the last surface thereby holding all of the surfaces together in locking relationship. Again, a single common space can be used to fill device 43.

Figure 45:
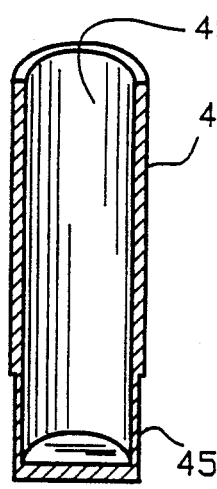
FIGS. 45-47 show flexible inserts adapted to receive material injected therein.
Figure 46:
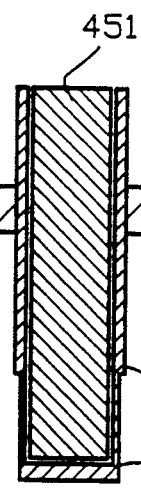
Figure 47:
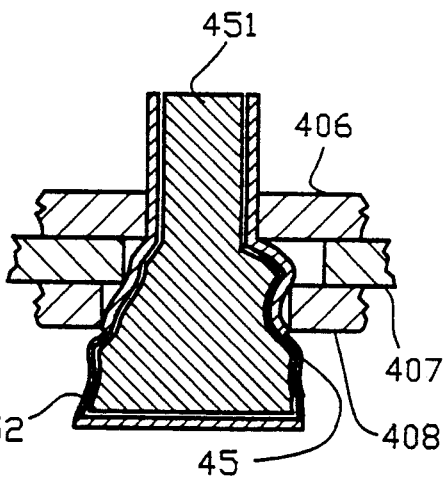
Figure 48:
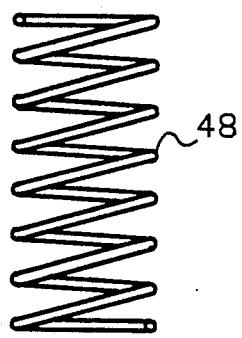
FIGS. 48-51 show a spring-like insert which provides rigidity for reception of extraneous material after insertion of the fastener.

FIGS. 45-47 show a flexible fastener 45 hollow in nature which can be inserted into a workpiece surface having an irregular aperture. This can be seen in FIGS. 46 and 47 where workpieces 406, 407 and 408 are abutted to each other creating an aperture having an irregular internal opening. In such a situation, flexible fastener 45 can be inserted into the aperture and then, via opening 451, material can be added causing the fastener to expand and fill the void in the aperture. The fastener can also expand below the workpiece, via pre-weakened section 452 to lock the entire structure in place. This is shown in FIG. 47.

Another important use of the fastening device is in retrofitting an existing rivet for tightening a loose rivet. If an existing conventional rivet is removed, by drilling or otherwise, a flexible fastener can be inserted in the old rivet hole and then filled with material to cause it to expand.

In the situation where it is desired to leave the old conventional rivet in place, holes offset from the center can be drilled in the old rivet, the new fastener inserted and locking material injected into the new fastener. The locking material will expand and tighten the entire structure.

Figure 49:
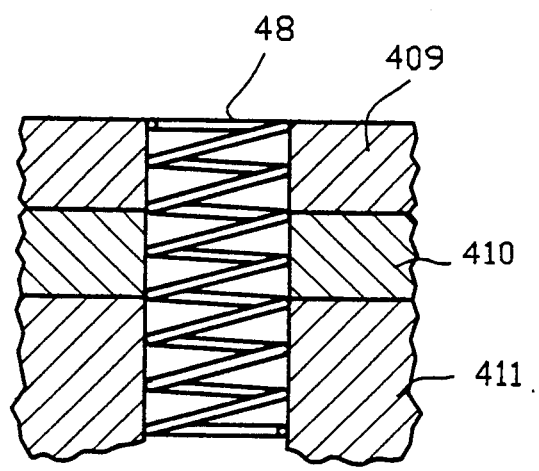
Figure 50:
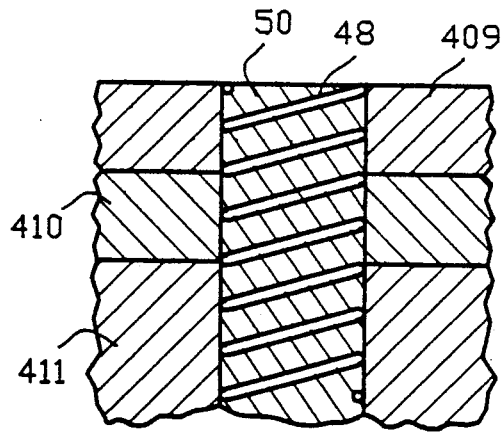

In FIGS. 48-51, a spring-like member 48 is utilized as the backbone of a fastener. The spring-like device, as shown in FIG. 49, is inserted into a series of abutted workpieces 409, 410 and 411. The aperture created with the abutted work pieces is substantially straight and as shown in FIG. 50, material 50 is injected through the top opening to fill the gaps between the spring member and the side. The spring member in such a case acts to give rigidity to the inserted material.

Figure 51:
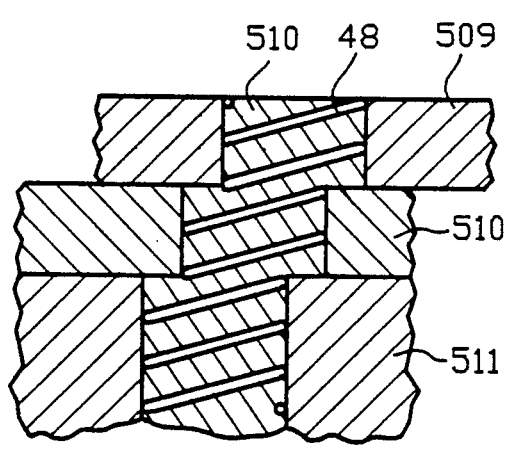

In FIG. 51, the aperture created by the abutted workpieces 509, 510 and 511 form an irregular shape and thus when spring member 48 is inserted in the aperture, it tends to take the general shape of the irregular opening. Upon subsequent application of external material device 48 acts as a backbone for that material in the irregular shape. Of course, depending upon the application, the consistency of the material can be adjusted so that it could either be hardened so that the work pieces are locked in place or allowed to remain semi-firm thereby allowing flexibility between the various workpieces. Device 48 acts as the backbone to give some measure of stress protection.

Figure 52:
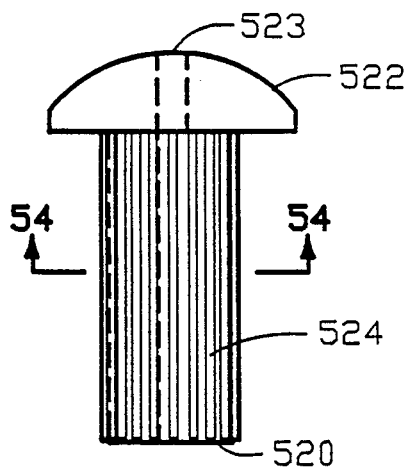
FIG. 52 shows a fastener with longitudinal stiffening on the outside.
Figure 53:
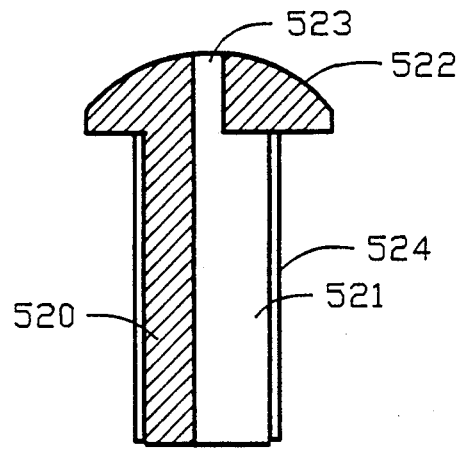
FIGS. 53 and 54 show sectional views thereof.
Figure 54:
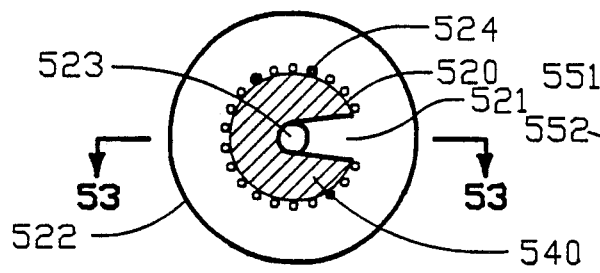

FIGS. 52-54 show fastener 520 having longitudinal fibers 524 displaced along the longitudinal axis around the body of the fastener. Note that FIG. 54 is a cross-sectional view taken along lines 54—54 of FIG. 52, while FIG. 53 is a cross-sectional view taken along lines 53—53 of FIG. 54. As shown in FIG. 52, head section 522 has a cavity 523 therein which extends down through the center of fastener 520. As shown in FIGS. 53 and 54, one section of cavity 523 is open in the form of a slot 521 established longitudinally in the fastener so that resilient material which is inserted in cavity 523 is free to flow out of slot 521. Because this material is contained within a workpiece as shown in FIG. 55, it will flow around fibers 524 thereby locking the fibers in place.

Figure 55:
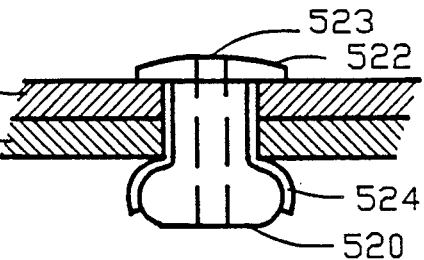
FIG. 55 shows a fastener with external stiffeners holding two workpieces together.
Figure 56:
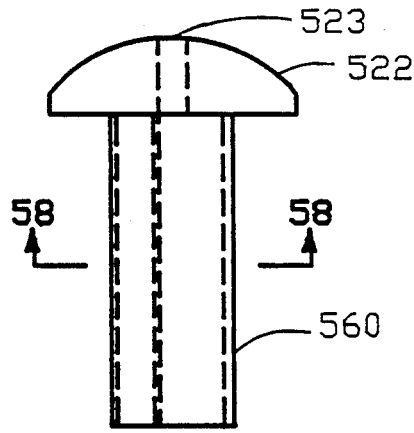
FIG. 56 shows a fastener with longitudinal stiffening on the inside.

In FIG. 55 fastening device 522, with longitudinal fibers 524 around the outside thereof, is inserted in two workpieces 551 and 552. In this embodiment, when resilient material is inserted in opening 523, it flows out of slot 521 to lock the fibers 524 in place around the outer body of fastener 520. The bulge at the base of fastener 520 is formed by the material flowing out of the slot at the base of the fastening device in the same manner as discussed above with respect to FIGS. 45-47.

Figure 57:
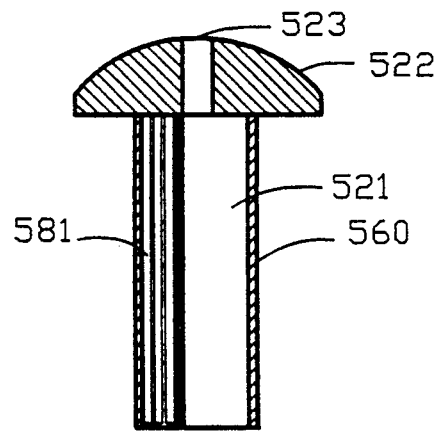
FIGS. 57 and 58 show sectional views thereof.
Figure 58:
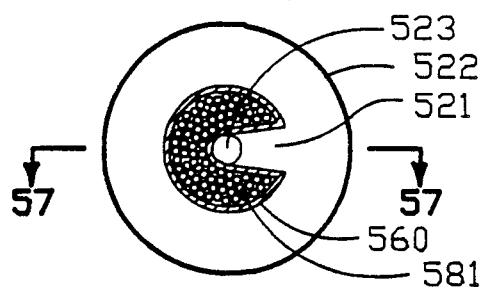

FIGS. 54-58 show a fastening device 560 having fibers 581 inserted within the hollow portion of the shank. This is in opposition to the device shown in FIG. 52 where the longitudinal fibers are disposed on the outside of the shank. Note that FIG. 58 is a cross-sectional view taken along the lines 58—58 of FIG. 56 while FIG. 57 is a cross-sectional view taken along the lines 57—57 of FIG. 58.

Figure 59:
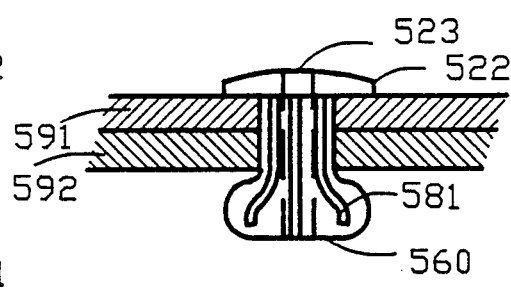
FIG. 59 shows a fastener with internal stiffeners holding two workpieces together.

In FIG. 59, fastening device 560 is shown inserted in workpieces 591, 592 for the purpose of holding the workpieces together. Fibers 581 are contained within the hollow shell of fastener body 560 and resilient material is inserted through opening 523 in head section 522 thereby holding the fibers in place and, in one embodiment, causing a bulge at the base of the fastener as discussed with reference to FIGS. 45-47.

While individual longitudinal fibers have been shown in the embodiments, it would be clear to any practitioner, that, in fact, the stiffening can be accomplished by a plurality of individual fibers or fibers linked together. In addition, a wire mesh could serve this same purpose by extending either around the shank of the fastener or by being rolled and inserted within the hollow section of the fastener body. Such an arrangement advantageously would have high shear strength and be very flexible for insertion in irregularly-shaped openings.

The present disclosure includes that contained in the appended claims as well as that of the foregoing description. Although this invention has been described in its preferred form with a certain degree of particularly, it is understood that the present disclosure of the preferred form has been made only by way of example and that numerous changes in the details of construction and the combination and arrangement of parts may be resorted to without departing from the spirit and scope of the invention.

Now that the invention has been described, I claim:

1. A fastening device for securing within an aperture of a workpiece, comprising in combination:
   a longitudinally extending body member for insertion within the aperture of the workpiece;
   a locking shoulder secured to said longitudinally extending body member for engagement with the workpiece;
   groove means disposed in said longitudinally extending body member; and
   resilient means established in said groove means for co-acting between said longitudinally extending body member and the workpiece for reducing undesired movement therebetween.

2. The invention as set forth in claim 1 further comprises at least one longitudinally extending stiffening member, and wherein said resilient means bonds said stiffening member to said longitudinally extending body member.

3. The invention as set forth in claim 2 wherein said stiffening member is internal to said longitudinal body member and extends substantially the length of said body member.

4. The invention as set forth in claim 2 wherein said stiffening member is external to said longitudinal body member and extends substantially the length of said body member.

5. A fastening device as set forth in claim 1 further comprising at least one longitudinally extending stiffening member and wherein said resilient means includes a thermo-liquifying material to seal the fastening device to the workpiece and to said stiffening member upon the application of heat.

6. A fastening device as set forth in claim 1 further comprising at least one longitudinally extending stiffening member and wherein said resilient means includes a thermo-expandable material to seal the fastening device to the workpiece and to said stiffening member upon the application of heat.

7. A fastening device as set forth in claim 1, wherein said resilient means is injected into the aperture of the workpiece between the fastening device and the workpiece.

8. A fastening device as set forth in claim 1, wherein said resilient means is a resilient adhesive.

9. A fastening device for fastening within an aperture of a workpiece, comprising in combination:
   a longitudinally extending body member for insertion within the apertion of the workpiece;
   groove means disposed in said longitudinally extending body member;
   a plurality of longitudinally extending fibers positioned along said body; and
   resilient means established in said groove means to extend between said longitudinally extending body member and the workpiece for reducing undesired movement between the fastening device and the workpiece and for locking said fibers to said body member.

10. A fastening device as set forth in claim 9, wherein said longitudinally extending body member comprises a substantially cylindrical body member; and
   said fibers are positioned at least partially within a core of said body.

11. A fastening device as set forth in claim 9, wherein said fastener has a head section attached to said body and wherein said groove means communicates with an aperture through said fastener head for enabling introduction of said resilient means after insertion of said fastener in the aperture of the workpiece.

12. A fastening device as set forth in claim 9, wherein said fastener has a head section attached to said body and wherein said groove means is disposed in the surface of said cylindrical member communicating with an aperture through said fastener head.

13. A fastening device as set forth in claim 9, wherein said groove means comprises annular grooves intermediately spaced along said cylindrical body member; and
   each of said annular grooves communicating with an aperture extending through said fastener head.

14. A fastening device as set forth in claim 9, wherein said groove means comprises an annular groove extending in said fastener head and communicating with an aperture through said fastener head enabling said resilient means to be introduced between said fastening device, said fibers and the workpiece after insertion within the aperture of the workpiece.

15. The method of stiffening a fastening device in an aperture in a workpiece, comprising the steps of:
   inserting the fastening device into the aperture of the workpiece;
   inserting along the body of said fastening device a plurality of stiffening fibers; and
   injecting a resilient material between the fastening device and said stiffening fibers.

16. The method as set forth in claim 15, wherein the step of injecting said material includes deforming the fastening device.

17. The method as set forth in claim 15, wherein the step of injecting a resilient material includes injecting the resilient material through an aperture in the fastening head.

18. The method as set forth in claim 15, wherein the step of injecting resilient material includes injecting a preheated thermo expandable resilient material through an aperture in the fastening head.

19. The method of installing a rivet into an aperture in a workpiece, the rivet having a cylindrical body and a rivet head with a head aperture extending through the rivet head and communicating with a groove in the cylindrical body of the rivet, comprising the steps of:
   inserting the cylindrical body of the rivet into the aperture of the workpiece;
   positioning along said rivet body a plurality of longitudinally extending fibers;
   deforming the cylindrical body of the rivet, including said fibers into mechanical engagement with the workpiece; and
   injecting a resilient material into the head aperture to fill the groove to resiliently engage the rivet and the workpiece.

20. The method as set forth in claim 19, wherein the step of injecting the resilient material includes injecting a thermo-sensitive material into the head aperture.

21. The method as set forth in claim 20, including the step of heating the thermo-sensitive material after injection.

22. A fastening device for securing within an aperture of a workpiece utilizing an externally supplied material, comprising in combination:
   a longitudinally extending initially flexible body member for insertion within the aperture of the workpiece, said body member having at least one stiffening member positioned along the longitudinal axis thereof; and
   means established within said flexible member for accepting the externally supplied material after said body member is inserted within said workpiece aperture, thereby locking said body member to said stiffening member and to said workpiece.

23. A fastening device as set forth in claim 22, wherein the externally supplied material includes a thermo-expandable material to lock said fastening device to said stiffening member and to the workpiece upon the application of heat.

24. A fastening device as set forth in claim 22, wherein the externally supplied material causes said body member and said stiffening member to secure to the workpiece aperture.

25. A fastening device as set forth in claim 22, wherein the externally supplied material causes said body member and said stiffening member to accept the shape of said workpiece aperture while also remaining flexible.

26. A fastening device as set forth in claim 22 wherein said means for accepting includes at least one opening in a top surface of said fastening device.

27. A fastening device as set forth in claim 22 wherein said fastening device contains a plurality of ports adapted to accept the externally supplied material from a common surface opening.

28. A fastening device as set forth in claim 22 wherein said body member is elongated in a dimension along an axis parallel to said workpiece wherein the externally supplied material is accepted via at least one opening in said body member.

29. A fastening device as set forth in claim 22 wherein said stiffening member is a plurality of fiber rods.

* * * * *